(12) United States Patent
Jablonski

(10) Patent No.: US 6,961,786 B2
(45) Date of Patent: Nov. 1, 2005

(54) FIBER LOOP LINKING/DETECTING

(75) Inventor: Charles Clark Jablonski, Monticello, GA (US)

(73) Assignee: LSI Logic Corporation, Milpitas, CA (US)

( * ) Notice: Subject to any disclaimer, the term of this patent is extended or adjusted under 35 U.S.C. 154(b) by 429 days.

(21) Appl. No.: 10/254,309

(22) Filed: Sep. 25, 2002

(65) Prior Publication Data

US 2004/0057660 A1 Mar. 25, 2004

(51) Int. Cl.[7] .............................................. G06F 13/00
(52) U.S. Cl. .............................. 710/10; 710/5; 710/36; 710/62; 710/72; 710/305; 714/1; 370/229; 370/351
(58) Field of Search ........................ 711/149, 154, 147, 711/114, 112; 710/8–9, 52, 5, 36–44, 18–19, 710/62, 72, 305, 316; 714/1, 4, 44, 8, 805; 370/221, 222, 249, 223, 282, 351, 229–236

(56) References Cited

U.S. PATENT DOCUMENTS

| | | | |
|---|---|---|---|
| 6,292,873 B1 * | 9/2001 | Keaveny et al. ............ | 711/149 |
| 6,324,669 B1 * | 11/2001 | Westby ....................... | 714/805 |
| 6,356,984 B1 * | 3/2002 | Day et al. ................... | 711/147 |
| 6,496,514 B2 * | 12/2002 | Su et al. ..................... | 370/452 |
| 6,529,963 B1 * | 3/2003 | Fredin et al. ................. | 710/1 |
| 6,560,683 B1 * | 5/2003 | Linnell et al. .............. | 711/154 |
| 6,697,914 B1 * | 2/2004 | Hospodor et al. .......... | 711/112 |
| 2001/0014956 A1 * | 8/2001 | Nagata et al. ................ | 714/8 |
| 2004/0153685 A1 * | 8/2004 | Tuttle et al. .................. | 714/1 |

* cited by examiner

Primary Examiner—Christopher Shin
(74) Attorney, Agent, or Firm—Yee & Associates, P.C.

(57) ABSTRACT

A mechanism is provided for detecting new devices added to a Fiber Channel adapter. When a device is added to a connector, the mechanism generates a device detect signal for that port. The Fiber controller receives device detect signals for the existing ports and generates port select signals to configure the port bypass. The controller may then simply poll the device detect signals in an internal register to automatically detect a new device being added or a device being removed without breaking the loop and without a high software overhead.

12 Claims, 5 Drawing Sheets

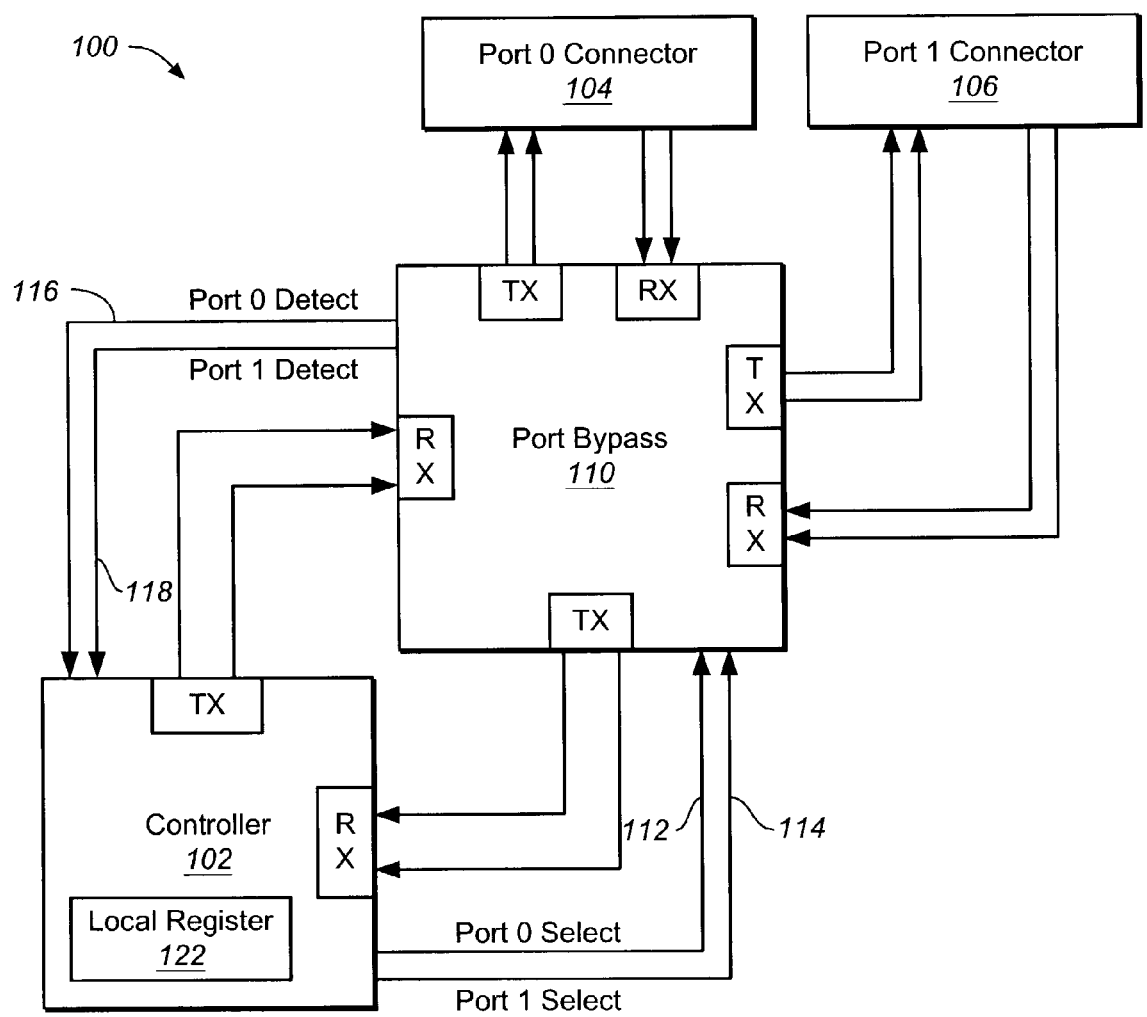
FIG._1

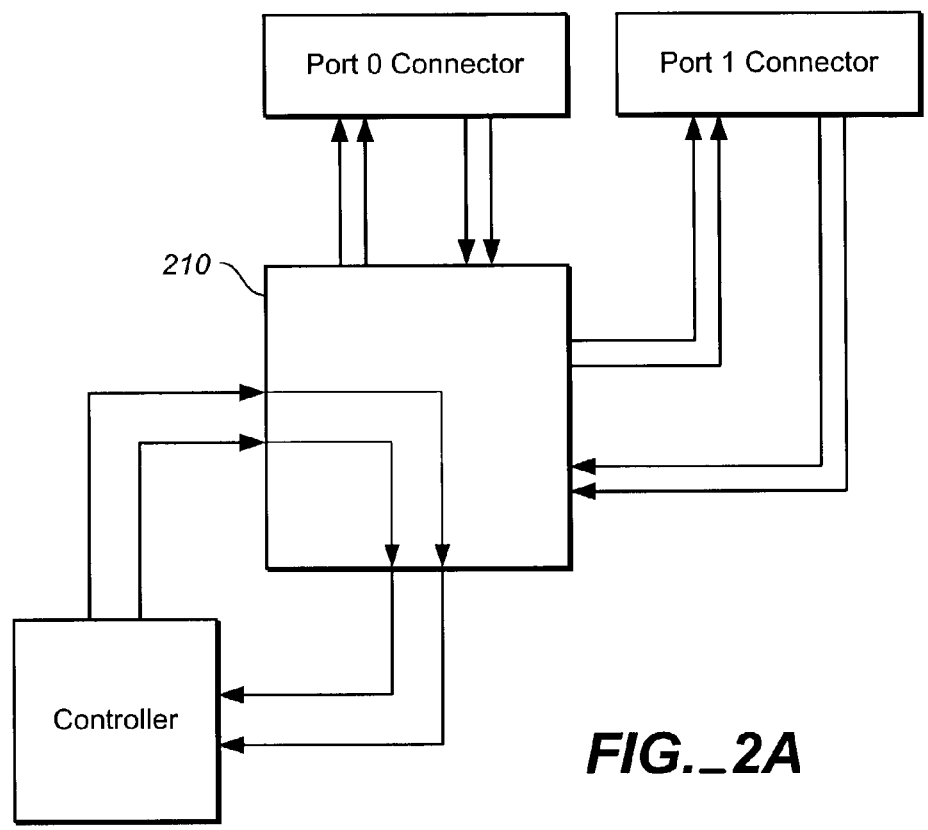
FIG._2A
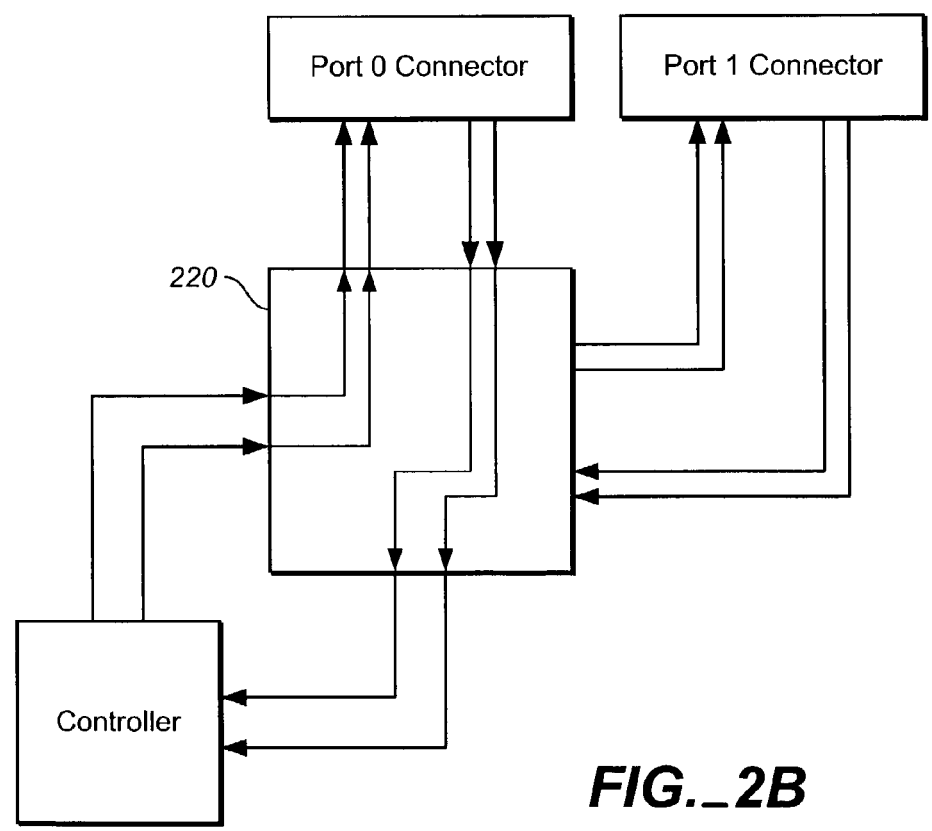
FIG._2B

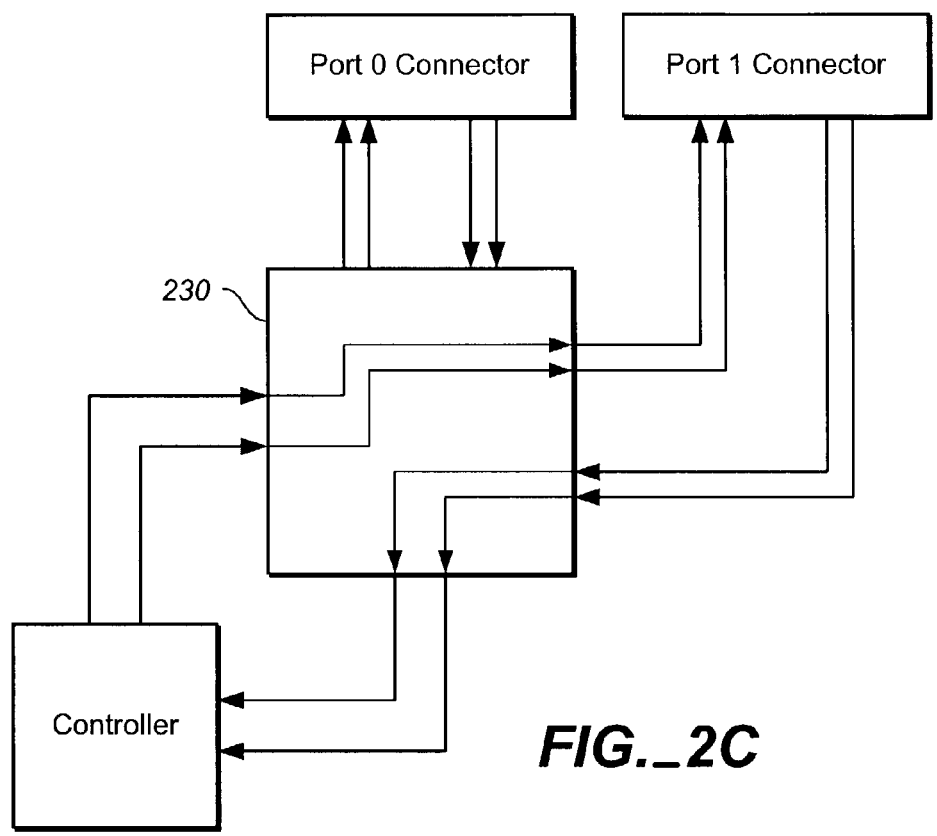
FIG._2C
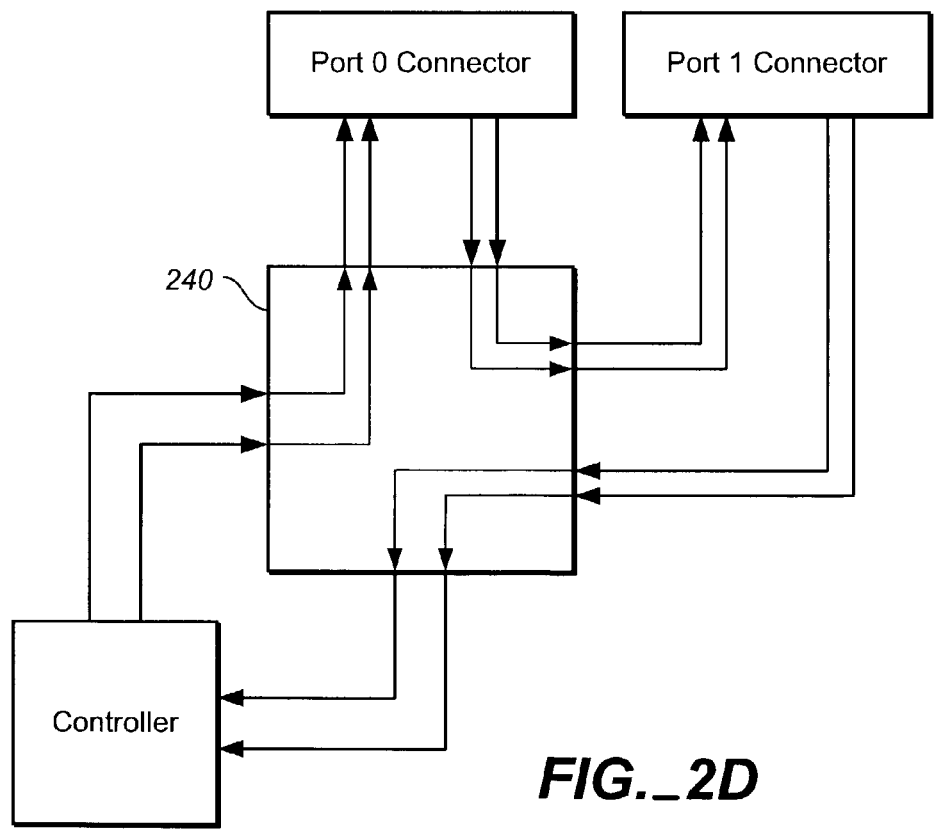
FIG._2D

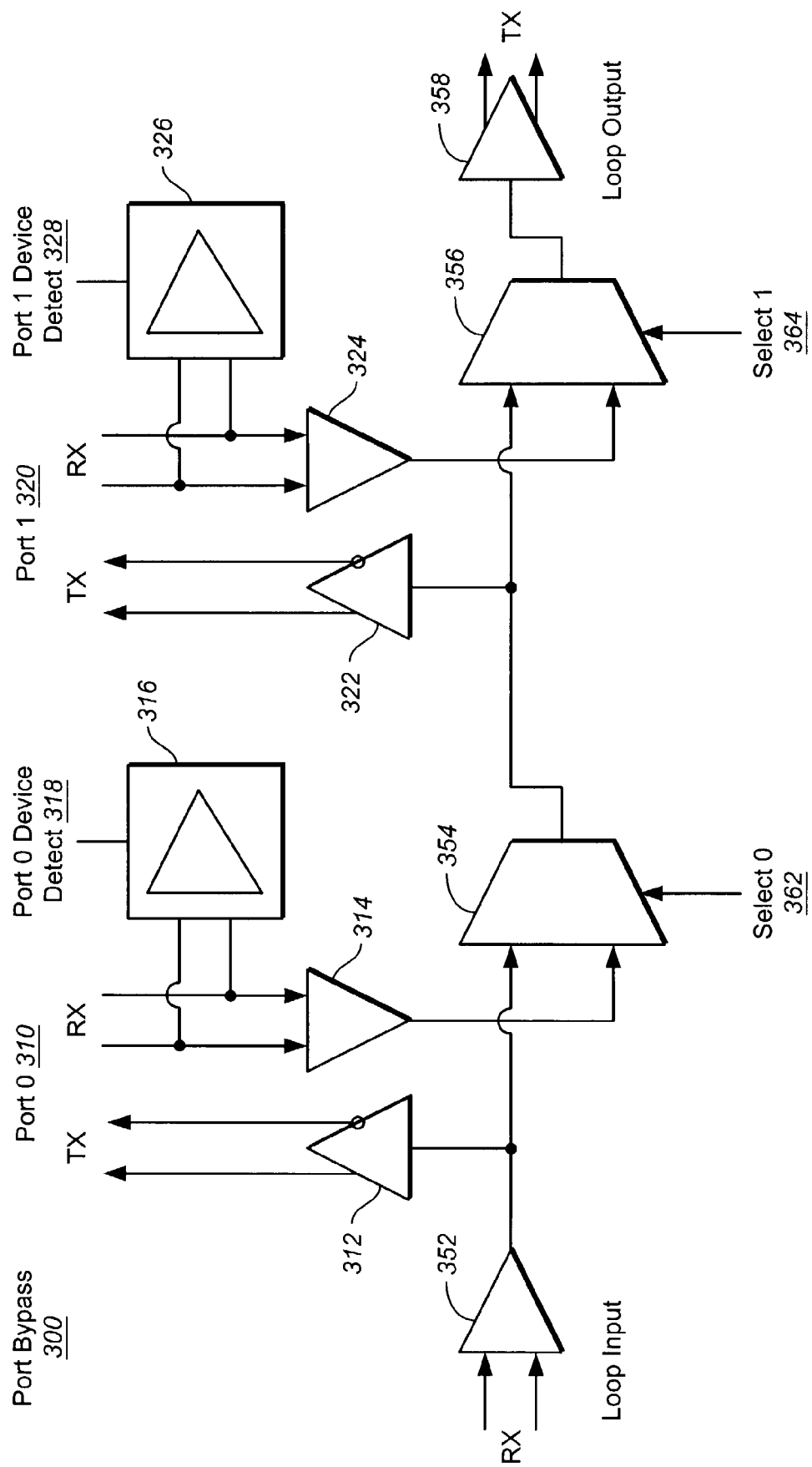
FIG._3

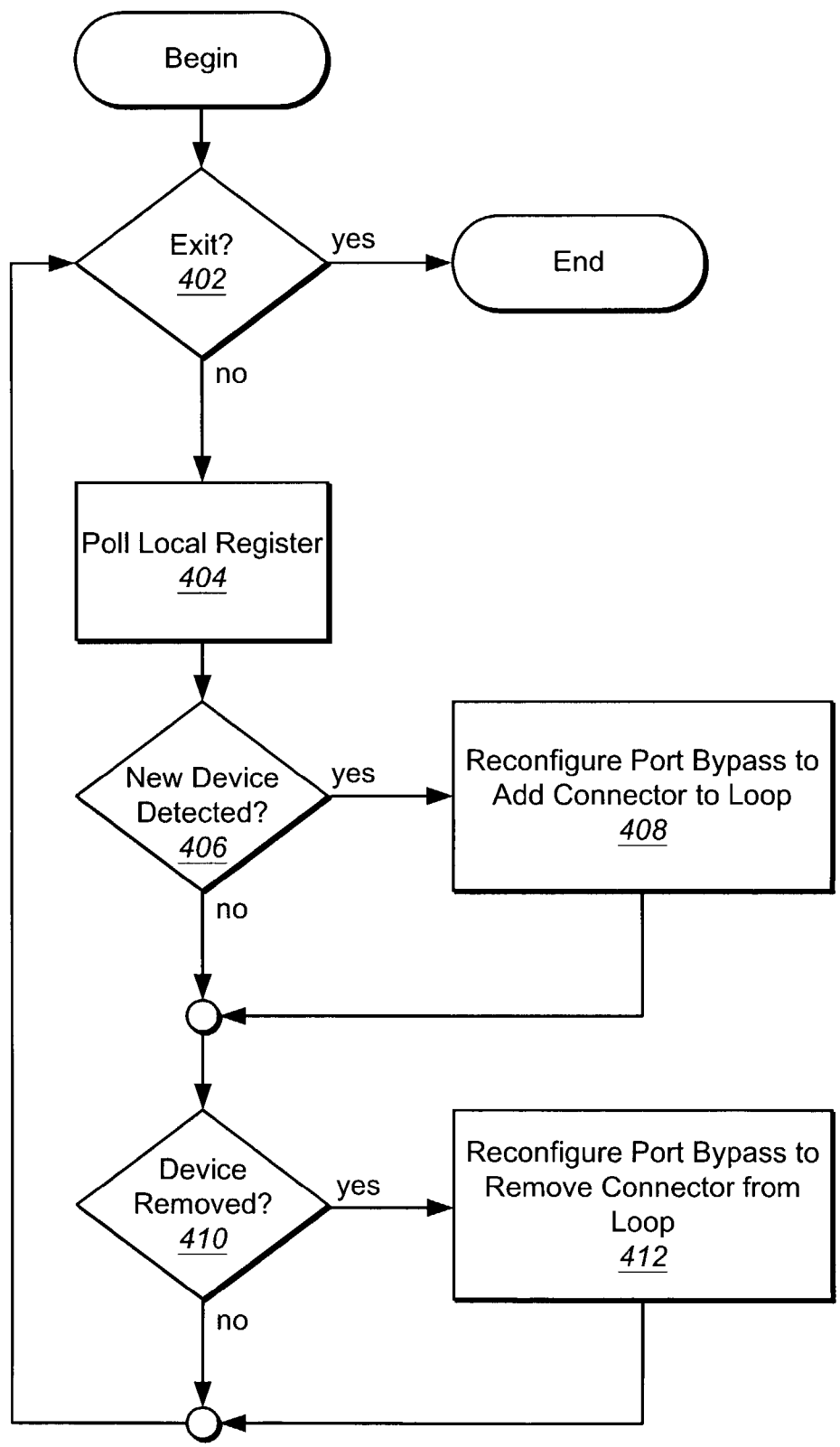
FIG._4

FIBER LOOP LINKING/DETECTING

BACKGROUND OF THE INVENTION

1. Technical Field

The present invention relates to Fibre Channel adapters and, in particular, to adding a device to a Fibre Channel Arbitrated Loop. Still more particularly, the present invention provides a method, apparatus, and program for detecting a new device and reconfiguring a Fibre Channel loop.

2. Description of the Related Art

Fibre Channel is a high-speed transport technology used to build Storage Area Networks (SANs). Fibre Channel can be configured point-to-point, via a switched topology or in a Fibre Channel Arbitrated Loop (FCAL). An arbitrated loop can connect up to 127 nodes without using a switch. In a FCAL, all devices share the bandwidth, and only two devices can communicate with each other at the same time, with each node repeating data to its adjacent node. A Fibre Channel adapter with an arbitrated loop may have two or more connectors for connecting devices. A port bypass circuit may be used to configure the loop to include devices connected to these ports.

Adding a device to the loop may require manual configuration of the adapter software to include the device. The software running in the controller must then break the loop, reconfigure the port bypass circuit to add the corresponding connector to the loop, and check for loop integrity. If the software detects that the loop is open, then the port bypass must be reconfigured to bypass a connector. Auto detection algorithms may be added to the software to determine when a device is added. However, these algorithms add software overhead, which significantly impacts the performance of the controller.

Therefore, it would be advantageous to provide an improved mechanism for detecting new devices added a controller and reconfiguring the Fibre Channel Arbitrated Loop.

SUMMARY OF THE INVENTION

The present invention provides a mechanism for detecting new devices added to a Fibre Channel adapter. When a device is added to a connector, the mechanism generates a device detect signal for that port. The Fibre controller receives device detect signals for the existing ports and generates port select signals to configure the port bypass. The controller may then simply poll the device detect signals in an internal register to automatically detect a new device being added or a device being removed without breaking the loop and without a high software overhead.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram illustrating an example Fibre Channel adapter architecture in accordance with a preferred embodiment of the present invention;

FIGS. 2A–2D are example block diagrams depicting Fibre Channel Arbitrated Loops configured using a port bypass in accordance with a preferred embodiment of the present invention;

FIG. 3 is a diagram depicting an example port bypass architecture in accordance with a preferred embodiment of the present invention; and FIG. 4, a flowchart illustrating the operation of a Fibre Channel controller, is shown in accordance with a preferred embodiment of the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, a block diagram is shown illustrating an example Fibre Channel adapter architecture in accordance with a preferred embodiment of the present invention. The Fibre Channel adapter 100 includes controller 102, which communicates with devices connected to port 0 connector 104 and port 1 connector 106. Devices connected to port 0 connector 104 and port 1 connector 106 form a Fibre Channel Arbitrated Loop (FCAL). Controller 102 configures the FCAL by sending port 0 select signal 112 and port 1 select signal 114 to port bypass module 110.

Each port connector includes a transmit and receive. A loop is formed by connecting the transmit (TX) from the controller to the receive (RX) of a device connected to one of the port connectors. The transmit/receive chain is continued for each device in the loop. The loop ends at the receive of the controller. The path is shown as a pair of wires. Typically in a Fibre Channel environment, data is transmitted as a differential between two wires. The wires may be, for example, a coaxial cable or a twisted pair. However, other methods for transmitting data may also be used. FIG. 1 is intended as an example and not as an architectural limitation for the present invention. In the depicted example, the port 0 connector may be an external connector, such as a High Speed Serial Data Connector (HSSDC), and the port 1 connector may be an internal connector, such as a point-to-point (PTP) connector. However, other combinations of connectors may be used and the adapter may also include more or fewer connectors depending on the implementation.

FIGS. 2A–2D are example block diagrams depicting Fibre Channel Arbitrated Loops configured using a port bypass in accordance with a preferred embodiment of the present invention. More particularly, FIG. 2A illustrates an example in which neither the port 0 connector nor the port 1 connector is included in the loop. Port bypass circuit 210 is configured to bypass both ports forming a loop from the controller directly back to the controller. In this example, the controller may assert neither the port 0 select signal nor the port 1 select signal.

FIG. 2B illustrates an example in which the port 0 connector is included in the loop. In this example, the controller may assert the port 0 select signal, thus configuring port bypass circuit 220 to include the port 0 connector in the loop and to bypass the port 1 connector. Similarly, FIG. 2C illustrates an example in which the port 1 connector is included in the loop.

In the example shown in FIG. 2C, the controller may assert the port 1 select signal, thus configuring port bypass circuit 230 to bypass the port 0 connector and to include the port 1 connector in the loop.

With respect to FIG. 2D, an example in which both the port 0 connector and the port 1 connector are included in the loop is shown. In this example, the controller may assert the port 0 select signal and the port 1 select signal, thus configuring the port bypass circuit 240 to include the port 0 connector and the port 1 connector in the loop. In this example, the controller sends data to the device connected to the port 0 connector, which may pass the data to the device connected to the port 1 connector. The loop is completed when data returns to the controller.

Returning to FIG. 1, controller 102 may be instructed to configure port bypass 110 by manually setting parameters using a host computer. Alternatively, controller 102 may execute auto detection software to determine when devices are added to port 0 connector 104 or port 1 connector 106. However, auto detection algorithms must break the loop to configure the port bypass and check for loop integrity. If the loop is open, the auto detection software must reconfigure the port bypass and recheck the loop for integrity. This software approach has a significant impact on the performance of the adapter.

In accordance with a preferred embodiment of the present invention, port bypass module 110 determines whether a device is connected to the connectors and generates port 0 detect signal 116 and port 1 detect signal 118. Controller 102 receives the port 0 detect signal and the port 1 detect signal. The controller may store the signal values in local register 122 and may then poll the local register to determine whether devices are attached to port 0 connector 104 or port 1 connector 106. The controller may then configure port bypass 110 using port 0 select signal 112 and port 1 select signal 114 efficiently and accurately without breaking the loop unnecessarily.

Turning to FIG. 3, a diagram depicting an example port bypass architecture is shown in accordance with a preferred embodiment of the present invention. Loop input is received by port bypass 300 at limiting amplifier 352. The data is transmitted to port 0 310 using differential amplifier 312. Data is received from port 0 310 through limiting amplifier 314. Multiplexor 354 is used to select between the loop input and the output of limiting amplifier 314. Multiplexor 354 is controlled by port 0 select signal 362.

The output of Multiplexor 354 is transmitted to port 1 320 using differential amplifier 322. Data is received from port 1 320 through limiting amplifier 324. Multiplexor 356 is used to select between the output of Multiplexor 354 and the output of limiting amplifier 324.

Multiplexor 356 is controlled by port 1 select signal 364. The output of Multiplexor 356 is provided as loop output through differential amplifier 358.

Port bypass 300 includes comparator 316 connected to the receive (RX) portion of port 0 310. Comparator 316 generates port 0 device detect signal 318, which indicates whether a device is connected to port 0. Similarly, port bypass 300 includes comparator 326 connected to the receive portion of port 1 320. Comparator 326 generates port 1 device detect signal 328, which indicates whether a device is connected to port 1. Thus, the controller may receive port 0 device detect signal 318 and port 1 device detect signal 328 and set port 0 select signal 362 and port 1 select signal 364 appropriately to configure the port bypass.

FIG. 3 is intended as an example and not as an architectural limitation for the present invention. The port bypass circuit shown in FIG. 3 may include more or fewer ports depending upon the implementation. Furthermore, the actual components used and the configuration of the components may vary within the scope of the invention.

With reference now to FIG. 4, a flowchart illustrating the operation of a Fibre Channel controller is shown in accordance with a preferred embodiment of the present invention. The process begins and a determination is made as to whether an exit condition exists (step 402). An exit condition may exist if the adapter is being shut down or otherwise brought offline, for example. If an exit condition exists, the process ends.

If an exit condition does not exist in step 402, the process polls the local register to determine whether devices are attached to the port connectors (step 404). Next, a determination is made as to whether a new device is detected (step 406). This may be determined by examining the local register. If a new device is detected, the process reconfigures the port bypass to add the connector to the loop (step 408) and a determination is made as to whether a device is removed from a connector (step 410). If a new device is not detected in step 406, the process proceeds directly to step 410 to determine whether a device is removed from a connector. This is also determined by examining the local register.

If a device is removed from a connector, the process reconfigures the port bypass to remove the connector from the loop (step 412) and returns to step 402 to determine whether an exit condition exists. If a device is not removed form a connector in step 410, the process proceeds to step 402 to determine whether an exit condition exists.

Thus, the present invention solves the disadvantages of the prior art by providing a mechanism for detecting new devices added to a Fibre Channel adapter. When a device is added to a connector, the mechanism generates a device detect signal for that port. The Fibre controller receives device detect signals for the existing ports and generates port select signals to configure the port bypass. The controller may then simply poll the device detect signals in an internal register to automatically detect a new device being added or a device being removed without breaking the loop and without a high software overhead.

What is claimed is:

1. A method, in a Fibre Channel adapter, for configuring a Fibre Channel loop, wherein the Fibre Channel adapter includes a controller and a port bypass, the method comprising:

receiving, at the controller from the port bypass, a first device detect signal for a first port;

receiving, at the controller from the port bypass, a second device detect signal for a second port;

storing the value of the first device detect signal and the value of the second device detect signal in a register in the controller;

polling the register for the value of the first device detect signal;

determining, by the controller, whether a device is connected to the first port based on the value of the first device detect signal; and configuring the port bypass to bypass the first port if a device is not connected to the first port.

2. The method of claim 1, further comprising:

configuring the port bypass to include the first port in the Fibre Channel loop if a device is connected to the first port.

3. The method of claim 2, wherein the step of configuring the port bypass to include the first port includes asserting a first port select signal to the port bypass.

4. The method of claim 1, wherein the step of configuring a port bypass to bypass the first port includes deasserting, by the controller, a first port select signal to the port bypass.

5. The method of claim 1, further comprising:
polling the register for the value of the second device detect signal;
determining whether a device is connected to the second port based on the value of the second device detect signal; and
configuring the port bypass to bypass the second port if a device is not connected to the second port.

6. The method of claim 5, further comprising:
configuring the port bypass to include the second port in the Fibre Channel loop if a device is connected to the second port.

7. An apparatus, in a Fibre Channel adapter, for configuring a Fibre Channel loop, wherein the Fibre Channel adapter includes a controller and a port bypass, the apparatus comprising:
first receipt means for receiving, at the controller from the port bypass, a first device detect signal for a first port;
second receipt means for receiving, at the controller from the port bypass, a second device detect signal for a second port;
storage means for storing the value of the first device detect signal and the value of the second device detect signal in a register in the controller;
polling means for polling the register for the value of the first device detect signal;
determination means for determining, by the controller, whether a device is connected to the first port based on the first device detect signal; and
configuration means for configuring the port bypass to bypass the first port if a device is not connected to the first port.

8. The apparatus of claim 7, further comprising:
means for configuring the port bypass to include the first port in the Fibre Channel loop if a device is connected to the first part.

9. The apparatus of claim 8, wherein the means for configuring the port bypass to include the first port includes means for asserting a first port select signal to the port bypass.

10. The apparatus of claim 7, wherein the configuration means includes means for deasserting, by the controller, a first port select signal to the port bypass.

11. The apparatus of claim 7, further comprising:
means for polling the register for the value of the second device detect signal;
means for determining whether a device is connected to the second port based on the value of the second device detect signal; and
means for configuring the port bypass to bypass the second port if a device is not connected to the second port.

12. The apparatus of claim 11, further comprising:
means for configuring the port bypass to include the second port in the Fibre Channel loop if a device is connected to the second port.

* * * * *